(12) United States Patent
Lehning

(10) Patent No.: US 9,304,197 B2
(45) Date of Patent: Apr. 5, 2016

(54) METHOD FOR CLASSIFYING MOVING VEHICLES BY TRACKING A POSITION VALUE OF THE VEHICLE

(71) Applicant: JENOPTIK Robot GmbH, Monheim (DE)

(72) Inventor: Michael Lehning, Hildesheim (DE)

(73) Assignee: JENOPTIK Robot GmbH, Monheim (DE)

( * ) Notice: Subject to any disclaimer, the term of this patent is extended or adjusted under 35 U.S.C. 154(b) by 430 days.

(21) Appl. No.: 13/961,370

(22) Filed: Aug. 7, 2013

(65) Prior Publication Data

US 2014/0049419 A1     Feb. 20, 2014

(30) Foreign Application Priority Data

Aug. 14, 2012    (DE) .......................... 10 2012 107 444

(51) Int. Cl.
| | |
|---|---|
| *G01S 13/58* | (2006.01) |
| *G08G 1/01* | (2006.01) |
| *G08G 1/015* | (2006.01) |
| *G01S 7/41* | (2006.01) |
| *G01S 13/91* | (2006.01) |

(52) U.S. Cl.
CPC ................ *G01S 13/589* (2013.01); *G01S 7/41* (2013.01); *G01S 13/584* (2013.01); *G01S 13/91* (2013.01); *G08G 1/015* (2013.01); *G08G 1/0116* (2013.01)

(58) Field of Classification Search
CPC ..... G01S 13/584; G01S 13/589; G01S 13/91; G01S 7/41; G08G 1/0116; G08G 1/015

USPC .......................................................... 342/107
See application file for complete search history.

(56) References Cited

U.S. PATENT DOCUMENTS

| | | | |
|---|---|---|---|
| 4,985,705 A | 1/1991 | Stammler | |
| 2004/0227661 A1* | 11/2004 | Godsy | G01S 13/325 342/70 |
| 2008/0278365 A1* | 11/2008 | Klein | G01S 13/584 342/104 |
| 2008/0278366 A1* | 11/2008 | Behrens | G01S 7/41 342/109 |

FOREIGN PATENT DOCUMENTS

| | | |
|---|---|---|
| DE | 38 10357 A1 | 10/1989 |
| EP | 1 990 654 A1 | 11/2008 |
| EP | 2 011 103 B1 | 3/2011 |
| WO | WO 2007/111512 A1 | 10/2007 |

OTHER PUBLICATIONS

Fang, J.X., et al.; "A Ground Vehicle Classification Approach Using Unmodulated Continuous-Wave Radar"; IET International Conference on Radar Systems 2007; pp. 1-4.

Fang, et al.;"A Low-cost Vehicle Detection and Classification System based on Unmodulated Continuous-wave Radar";Intelligent Transportation Systems Conference 2007; pp. 715-720.

* cited by examiner

*Primary Examiner* — Timothy A Brainard
(74) *Attorney, Agent, or Firm* — Duane Morris LLP

(57) ABSTRACT

Method in which vehicles are measured repeatedly while traveling through a radar cone, and specific position values are formed so as to be associated with the measurement times. This can be a specific radial distance or a specific object angle. The change over time is analyzed with respect to a section of discontinuity. The length of this section depends upon the length of the vehicle and makes classification possible.

5 Claims, 3 Drawing Sheets

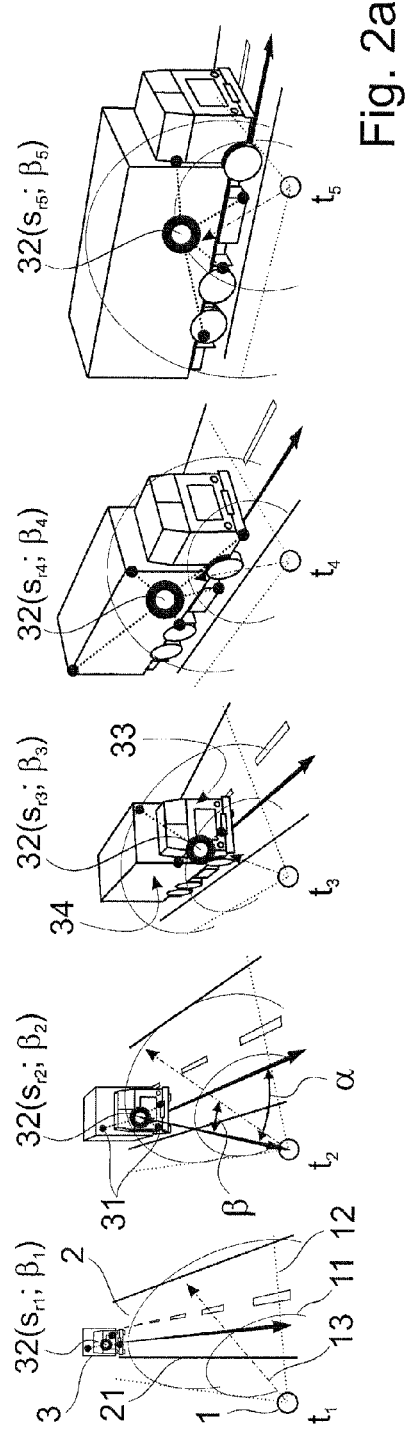
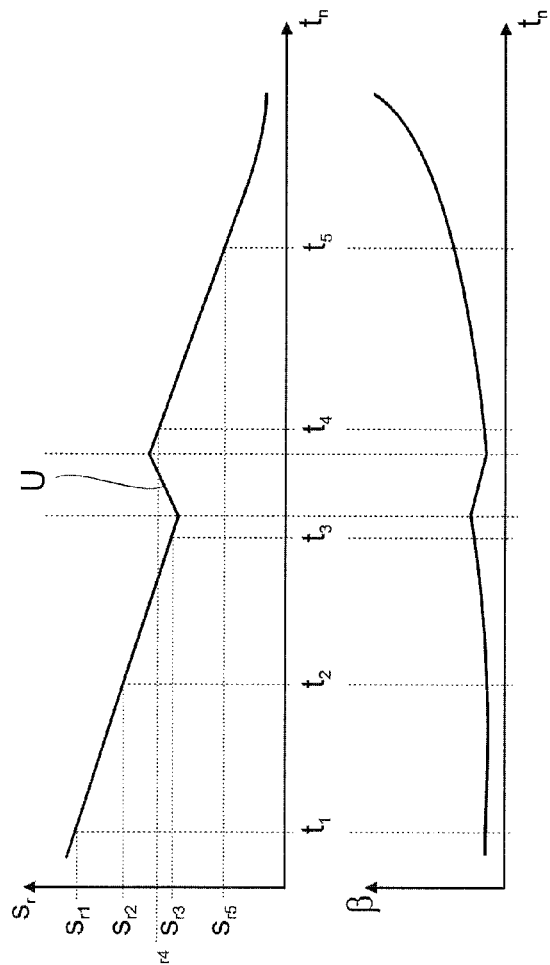
Fig. 2a
Fig. 2b
Fig. 2c

METHOD FOR CLASSIFYING MOVING VEHICLES BY TRACKING A POSITION VALUE OF THE VEHICLE

RELATED APPLICATIONS

The present application claims priority benefit of German Application No. DE 10 2012 107 444.5 filed on Aug. 14, 2012, the contents of which are incorporated by reference in its entirety.

FIELD OF THE INVENTION

The invention is directed to a method for classifying vehicles such as is known generically from patent document EP 2 011 103 B1.

BACKGROUND OF THE INVENTION

The classification of vehicles in moving traffic has a wide spectrum of applications. Automatic rough classification for differentiating large, slower vehicles (trucks, busses) from smaller, faster vehicles (passenger cars) is particularly important in the context of automated monitoring and control of road traffic. According to the class of vehicle detected, for example, different tolls can be charged, traffic light installations can be controlled, or traffic violations can be penalized based on vehicle classes.

In the methods for rough classification of vehicles known from the prior art, vehicles are often classed by determining individual vehicle length based on the entry and exit of a vehicle into and from the measuring zone of a measuring arrangement. A feature of vehicle length which can be evaluated and which allows the vehicle to be assigned to the class of busses and trucks or to the class of passenger cars can be generated from the received measurement signals with sufficient certainty by means of evaluation methods. Known arrangements for this purpose work either with induction loops, which perform the classification based on the length and ground clearance of the vehicle determined when the vehicle drives through, or with radar devices which perform the classification based on the passage of the vehicle through the cone of the radar beam (radar cone) by means of a vehicle length that is determined from the duration of passage and the speed.

In a method disclosed in Laid Open Application EP 1 990 654 A1, the vehicle length is determined by means of a radar device which is installed next to the roadway at an acute angle to the edge of the roadway. Based on distance points which are determined from the entry and exit of the vehicle and on the known installation angle, the length of the stretch of road traveled by the vehicle through the radar cone can be determined. The total distance covered by the vehicle within this time can be determined from the detected vehicle speed and transit time. Accordingly, the vehicle length can be calculated from the difference between the total distance and the transit distance, and the detected vehicle can be classified by comparison with the vehicle lengths typical of a class. Error effects resulting from one vehicle being concealed by another cannot be remedied with this method.

In a method described in Laid Open Application DE 38 10 357 A1, classification is likewise carried out based on the detected vehicle length. For this purpose, a Doppler echo is initially received during passage of a vehicle through the radar cone of a radar device, and the frequency is determined with maximum amplitude from the frequency spectrum of this Doppler echo. A speed is determined based on this frequency. The vehicle length can then be determined from the speed and the signal duration of the Doppler echo. The measurement of vehicle length by signal duration entails a number of error influences. Due to the fact that the radar radiation is reflected by a surface whose size depends on the length of the vehicle, the signal duration is detected in such a way that it is distorted by the vehicle length on principle. Further, the radar beam which is directed obliquely on the vehicles causes shadowing on parts of the vehicles which results in a distorted length measurement. A correction factor which is determined separately and empirically for each influencing variable is used to increase the accuracy of length measurement. Finally, the classification is carried out by comparing the corrected time curve of the Doppler echo with that of stored, identified models. However, the determined vehicle length is ultimately only a very rough estimation which can easily lead to erroneous classifications.

A possibility for classifying vehicles without direct detection of vehicle length is described in patent document EP 2 011 103 B1. A radar beam is aligned along a traffic route by a radar device. A linear frequency modulated CW radar device is used allowing speeds and distances of traffic participants to be determined. The signals reflected by the traffic participants are separated from noise and evaluated in a data processing device. As a result of this processing, two Fourier transformation coefficients are generated; one coefficient is a function of the distance of the detected traffic participants and the other coefficient is a function of the speed of the detected traffic participants. When the two functions are plotted versus one another in the two dimensions of a Cartesian graph, characteristic patterns emerge for the different traffic participants. The composition and shape of these patterns is a measurement of the spread of the speeds and distances of the reflected signals of a traffic participant, the statistical evaluation of which allows traffic participants to be assigned to predefined classes. However, because of the measuring principle of the linear frequency modulated CW radar device, no angles can be associated with acquired objects. Therefore, while it is possible to ascertain the presence, e.g., of a passenger car or a truck in the radar cone, this assertion cannot be assigned with certainty insofar as there is more than one traffic participant located within the radar cone at the same time.

OBJECT OF THE INVENTION

It is the object of the invention to find a method suitable for simultaneously and reliably classifying a plurality of vehicles passing through a radar cone.

In a method for classifying moving vehicles by tracking a position value of the vehicle in which vehicles are measured while passing through a radar cone formed by radar radiation in that the surfaces of the vehicles impinged by radar radiation reflect the radar radiation and generate measurement signals in a radar device emitting and receiving the radar radiation, the above-stated object is met, according to the invention, through the following method steps.

A radar device which receives a plurality of measurement signals at a plurality of measurement times within a measurement duration, wherein a radial velocity and, as position values, a radial distance and an object angle can be derived for each measurement signal, is arranged at a known installation height and a known vertical installation angle relative to the surface of a roadway and at a known horizontal installation angle and distance relative to an edge of the roadway.

This radar device emits a radar beam forming a radar cone, and measurement signals are acquired at a plurality of measurement times.

Radial velocities, object angles and radial distances are derived from the above-mentioned measurement signals for each measurement time and are assigned to a vehicle giving rise to them, as the case may be, while driving through the radar cone.

For each measurement time, a specific position value is formed from the radial distances or object angles associated with a vehicle by the same computation rule in each instance and a vehicle speed is calculated.

The specific position values are stored as a function over a measurement duration encompassing the measurement times, and a section of discontinuity that is bounded by sudden changes in the specific position value over the measuring period is determined in the curve of the function.

Lastly, a speed-normalized length of the section of discontinuity is determined by means of the calculated vehicle speed, and this speed-normalized length of the section is compared with stored speed-normalized lengths of such sections which are typical of various classes of vehicle in order to classify the vehicle. The vehicle is then classified in the vehicle class to which the speed-normalized length of the section of the stored typical length comes closest.

In an advantageous manner, the specific position value for each measurement time is formed by calculating the arithmetic mean of the radial distances associated with this measurement time, wherein at least one of the installation angles is an acute angle.

Alternatively, the specific position value is advantageously formed per measurement time by calculating the arithmetic mean of the object angle associated with this measurement time, wherein at least one of the horizontal installation angles is an acute angle and the vertical installation angle is less than 5°.

It is also advantageous when at least one vehicle-specific coordinate system (which is preferably corrected at every measurement time) is calculated from the associated measurement signals so as to be related to the measurement time, the position and orientation of the vehicle-specific coordinate system being defined at each measurement time by a temporary location of the coordinate origin determined by the specific position value and a temporary driving direction, and the radial distances and object angles which are derived at each measurement time and which respectively represent location coordinates of a rough target at the vehicle at this measurement time are converted in each instance into the vehicle-specific coordinate system, and the statistical distribution of the position of the rough targets is then compared with stored distributions (determined by the geometry of the vehicle) typical of different vehicle classes so as to verify the classification of the vehicle that has been made.

In a particularly advantageous manner, the statistical distribution of the position of the rough targets at individual measurement times is combined by superimposing the coordinate systems.

BRIEF DESCRIPTION OF THE DRAWINGS

The invention will be described in more detail in the following with reference to embodiment examples. The accompanying drawings show:

FIG. 2a is the basic process of acquiring rough targets on a vehicle moving through the radar cone;

FIG. 2b is a distance-time graph;

FIG. 2c is an object angle-time graph; and

DESCRIPTION OF THE EMBODIMENTS

Figure 1:
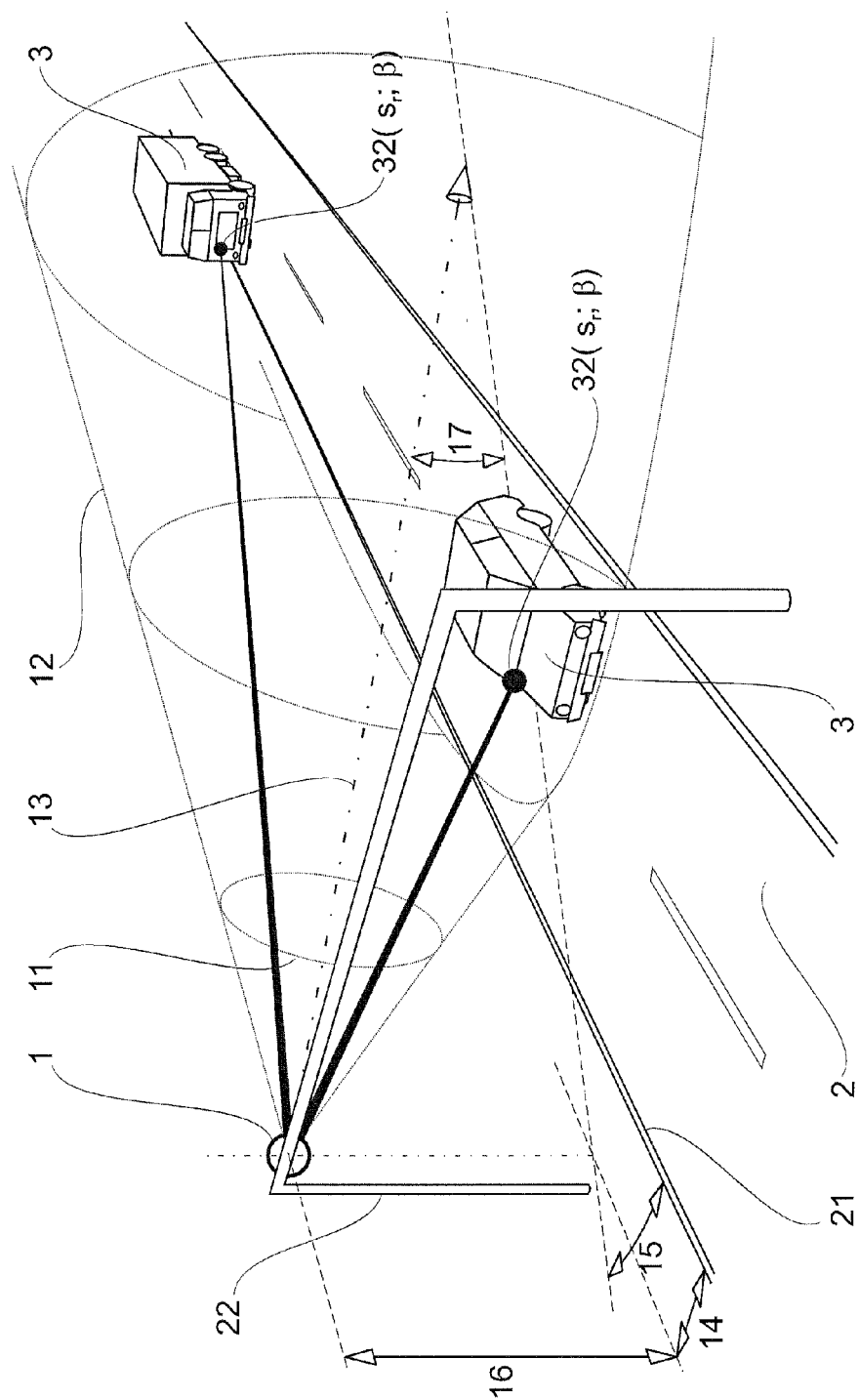
FIG. 1 is a schematic depiction of a possible arrangement of a radar device relative to a roadway.

A FSK radar device which is a special type of FMCW radar known from the prior art is used as a radar device 1 for the method for classifying a vehicle 3 traveling on a roadway 2 or also for simultaneously classifying a plurality of vehicles 3 traveling on a roadway 2. A plurality of vehicles 3 can be simultaneously acquired and also tracked by the FSK radar device 1. A FSK radar device 1 (FSK=Frequency Shift Keying) emits radar radiation 11 on at least two alternating carrier frequencies and receives reflection signals of the at least two alternating carrier frequencies caused by detected vehicles 3. A good resolution between a plurality of vehicles 3 corresponding to the radial distances, radial velocities and object angles thereof relative to the radar device 1 is made possible within a short measuring duration through the evaluation of frequency shifts between and within the at least two carrier frequencies reflected by the vehicles 3.

In order to implement the method according to the invention, it is required on principle that the position and orientation of the radar device 1 relative to the roadway 2 be known exactly unless the learning of the radar device 1 takes place immediately before the method is carried out and the method is not related to an optional, vehicle-specific traffic violation penalty for which a calculation of the true vehicle speed must be carried out.

FIG. 1 shows a practical installation of the radar device 1 to better describe possible positions and orientations of the radar device 1 relative to the roadway 2. In this case, the radar device 1 is arranged in a position in which it is located in the immediate vicinity of a roadway edge 21 next to the roadway 2 and above the surface of the roadway 2 at the height of a bridge 22 spanning the roadway 2. The position of the radar device 1 can be described based on a horizontal, perpendicular installation distance 14 from the roadway edge 21 and a vertical, perpendicular installation distance 16 from the surface of the roadway 2. Depending on the radiating characteristics of the radar device 1, the radar radiation 11 forms a radar cone 12 which proceeds in an expanding manner from the radar device 1 and has an axis of symmetry 13. The orientation of the radar cone 12 and, therefore, of the radar device 1 relative to the roadway 2 can be described based on a horizontal installation angle 15 of the axis of symmetry 13 relative to the roadway edge 21 and a vertical installation angle 17 of the axis of symmetry 13 relative to the surface of the roadway 2.

Further derivable features for a detected vehicle 3 can then be calculated from the position and orientation of the radar device 1 and from the determination of directly derivable measurement quantities (radial velocity, radial distance and object angle) generated from the reflection signals. The further derivable features can be, for example, a driving direction or a vehicle angle α and a vehicle speed.

In this case, the driving direction is the actual forward movement direction of the vehicle 3 on the roadway 2 which does not coincide with the direction of the radial distance with respect to the radar device 1 and which, besides this, need not necessarily correspond to the directional course of the roadway 2, i.e., need not run parallel to the roadway edge 21, e.g., because the vehicle 3 changes lanes.

At the same time, the vehicle angle α, which is formed by the longitudinal axis of the vehicle 3 in driving direction and the direction of the radial distance from the radar device 1, can be deduced from the driving direction.

The vehicle speed is the actual speed at which the vehicle 3 travels on the roadway 2 in driving direction.

If the vehicle 3 is reduced to the reflection signal of an individual point reflector for the sake of simplicity, the radial distance corresponds to the direct distance of the point reflector from the center point of the transmitting unit of the radar device 1 emitting the radar beam 11 through which the axis of symmetry 13 of the radar cone 12 also extends. The radial distance can be derived directly from a measured phase shift between the reflection signals of the at least two carrier frequencies used by the FSK radar 1. Since the radar device 1 is arranged outside the roadway 2 at an angle to the roadway edge 21 and to the surface of the roadway 2, the radial velocity is only the speed component of the real vehicle speed that is detected through the approach of the point reflector (in direction of the radial distance) taking place directly toward the radar device 1.

Object angle refers herein to the angle formed in the center of the transmitting unit of the radar device 1 emitting the radar radiation 11 between the axis of symmetry 13 of the radar cone 12 and the direct connection between the point reflector and the center of the transmitting unit of the radar device 1 (direction of radial distance). It will be clear to the person skilled in the art that this represents a simplification so as not to complicate the description of the invention unnecessarily by introducing an axis of an angle-resolving receiver unit extending parallel to and negligibly close to the axis of symmetry 13.

In order to receive the directly derivable measurement quantities, the radar device 1 is positioned relative to the roadway 2 in a first method step such that the vehicles 3 move through the radar cone 12 and reflection signals occurring on surfaces of the vehicles 3 which are impinged by radar radiation 11 and which reflect radar radiation 11 can be acquired. The reflecting surfaces of the vehicles 3 are formed by a plurality of minireflectors. The minireflectors are very small surface portions of the vehicle 3 whose extension and orientation relative to the radar radiation 11 can generate a reflection signal. A reflection signal of sufficient intensity to be detected will occur at surface portions of the vehicle 3 in which a plurality of minireflectors lie close together spatially. A localized accumulation of minireflectors such as this is taken together when receiving the directly derivable measured quantities and is referred to as a rough target 31. As it approaches the radar device 1, a vehicle 3 has an increasing quantity of rough targets 31 which contribute to the formation of the measurement signal proceeding from the vehicle 3. Rough targets 31 frequently occur, for example, at elements such as vehicle license plates, exterior mirrors or door handles of the vehicles 3.

The radar device 1 can be positioned in proximity to the ground, e.g., at the typical height of the wheel axles of the vehicles 3, next to the roadway edge 21 with the axis of symmetry 13 oriented parallel to the surface of the roadway 2. Accordingly, the vertical angle 17 with respect to the roadway 2 is 0° and need not be further taken into account in calculating other evaluable features. The radar cone 12 is preferably so oriented horizontally 14 that the vehicles 3 can be detected starting from a location at a great distance from the radar device 1 (virtually frontally) to a location close to the radar device 1 (virtually laterally). The axis of symmetry 13 of the radar cone 12 is so oriented with respect to the roadway edge 21 that it intersects the roadway 2 at a horizontal angle 15.

It is also possible to position the radar device 1 directly above the roadway 2 at the height of a bridge 22 passing over the roadway 2 with the axis of symmetry 13 oriented parallel to the roadway edge 21. Accordingly, the horizontal angle 15 with respect to the roadway edge 21 is 0° and need not be further taken into account in calculating the other evaluable features. Vertically 16, the radar cone 12 is so oriented that the vehicles 3 can be detected at a location at a great distance from the radar device 1 (virtually frontally) to a location close to the radar device 1 (virtually from above). In this case, the axis of symmetry 13 of the radar cone 12 is so angled relative to the roadway 2 that it impinges on the surface of the roadway 2 at a vertical angle 17.

In a subsequent, second method step a radar beam 11 forming a radar cone 12 is emitted by the radar device 1 and the measurement signals generated by the vehicles 3 through reflection are acquired at a plurality of measurement times $t_n$, by the radar device 1.

In order to produce a sufficient separation in the detected measurement signals from the ambient noise that is acquired at the same time on principle and in order to improve unambiguity in the signal detection, a threshold value is determined for the signal intensity, which threshold value must be exceeded by the measurement signal in order to be used for further signal processing.

In principle, the threshold value can also be defined by the sensitivity limit of the receiver of the radar device 1, which sensitivity limit is technically determined and cannot be actively assigned.

As is shown in FIG. 2a reduced to five measurement times $t_n$, the detection of measurement signals takes place during the passage of the vehicle 3 through the radar cone 12 at a plurality of measurement times $t_n$. The interval between the measurement times $t_n$ can be adapted depending on the required resolution of the measurement and the technical specifications of the radar device 1 and an associated signal processing arrangement.

In a third method step, a radial distance, an object angle and a radial velocity (collectively referred to as measured quantities) are derived respectively for a plurality of rough targets 31 from the measurement signals acquired at a measurement time $t_n$. The radial distance and the object angle are position values. They are then stored so as to be associated with a vehicle 3 taking into account as far as possible a maximum possible spread of the measured quantities for possible rough targets 31 on a vehicle 3. Since the measured values include the position values of the rough targets 31, there can be a unique assignment simultaneously to a plurality of vehicles 3 passing through the radar cone 12. The assignment can be based on similarities of the directly derivable measured quantities of the rough targets 31. Rough targets 31 which are hardly distinguishable with respect to radial velocity, radial distance and object angle can be assigned to one and the same detected vehicle 3 with high probability. If this assignment can be applied over a plurality of measurement times $t_n$, the probability increases exponentially so that the assignment already has a high reliability after a few intervals. When at least some of the measurement signals—and, therefore, at least a partial amount from all of the acquired rough targets 31—have been uniquely assigned to a vehicle 3 at a plurality of measurement times $t_n$, the prerequisite has been created for tracking the corresponding vehicle 3 as it continues through the radar cone 12 and also assigning further developing rough targets 31 having the characteristics corresponding to the partial amount to this vehicle 3.

In a fourth method step, a specific position value 32, in this case a specific radial distance $s_r$, is formed in each instance from the derived radial distances associated with a vehicle 3 and a measurement time $t_n$ with the same computation rule at each measurement time $t_n$. Various computation rules can be considered for this purpose.

For example, the specific position value 32 is determined at each measurement time $t_n$ from the arithmetic mean of all radial distances of the rough targets 31 acquired from this vehicle 3. Instead of a computation rule for averaging, the specific position value 32 could also be formed by a different computation rule.

The forming of the specific position value 32 based on radial distances $s_r$ is illustrated in FIG. 2a and described more fully in the description relating to the fifth method step.

After forming the specific position values 32, the vehicle 3 is embodied at every measurement time $t_n$ by the specific position value 32 and can be reduced to this during signal processing. The radial velocity, the radial distance and the object angle can then be determined for the specific position values 32 and stored in exactly the same way as for the individual rough targets 31. The measured quantities determined for the specific position values 32 can likewise be used for calculating the further evaluable features (driving direction and vehicle speed) of the vehicle 3.

The importance of the evaluation of the specific position values 32 for classifying the vehicle 3 is critical to the invention. In a fifth method step, all of the specific position values 32 formed at measurement times $t_n$ during the passage of the vehicle 3 through the radar cone 12 are stored as a function over the measurement duration encompassing measurement times $t_n$. The curve of the function is assessed and a section of discontinuity U is determined in the curve of the function. It was possible to demonstrate empirically that this section of discontinuity U is characteristic for the vehicle size.

The occurrence of the section of discontinuity U is illustrated with reference to FIG. 2b. As has already been described, the specific position value 32 for a measurement time $t_n$ according to the first embodiment example is formed from the radial distances of all of the rough targets 31 acquired for the vehicle 3 at this measurement time $t_n$. Depending on the vehicle angle $\alpha$ taken by the driving direction of the vehicle 3 when passing through the radar cone 12 relative to its axis of symmetry 13, the acquired rough targets 31 change continuously, i.e., identical rough targets 31 as well as different rough targets 31 are acquired at the individual measurement times $t_n$ so that the location to which the specific position value 32 can be assigned with a specific radial distance $s_r$ and a specific object angle $\beta$ is not a fixed point on the vehicle 3 but rather moves on the surface of the vehicle 3, which manifests itself by a discontinuous change in the specific radial distance $s_r$ and in the specific object angle $\beta$.

In the example shown in FIG. 2a and FIG. 2b, it is largely the surfaces of the vehicle front 33 that are acquired by the radar beam 11 at the initial measurement times $t_1$ and $t_2$. Accordingly, the rough targets 31 can also only be formed by these surfaces (e.g., the license plate, the radiator grille, the part of the trunk extending over the cab) so that the acquired radial distances at these measurement times ($t_1$ and $t_2$) and, consequently, the determined specific radial distance $s_r$ are determined only by the location of the vehicle front 33.

At measurement time $t_3$, the vehicle 3 is already located in an object angle region such that surfaces of the vehicle flank 34 can also be acquired by the radar radiation 11 in addition to the surfaces of the vehicle front 33. It should be noted here that the viewing angle in FIG. 2a is rotated along with the passage of the vehicle 3 around an imaginary vertical axis running through the radar device 1 so as to make the distribution of rough targets 31 more clearly visible. However, the position of the radar device 1 with the radar cone 12 emanating therefrom actually remains unchanged relative to the roadway 2 during the entire measurement duration. Through the first acquisition of rough targets 31 of the vehicle flank 34, radial distances which become larger again in spite of the continuous approach of the vehicle 3 add to the formation of the specific radial distance $s_r$ so that the specific radial distance $s_r$ increases to a slight extent.

However, the change is so slight that they are barely visible in the time curve of the function (see FIG. 2b). Therefore, up to measurement time $t_3$ the graph of the function runs in the form of a linearly falling straight line which expresses the continuously decreasing radial distances of the rough targets 31 and, therefore, those of the specific radial distance value $s_r$ through the approach of the vehicle 3 to the radar device 1.

A clear reverse change in the specific radial distance value $s_r$ happens between measurement times $t_3$ and $t_4$. The vehicle 3 reaches an object angle region in relation to the radar device 1 in which the scattering of the rough targets 31 is more pronounced on the vehicle flank 34 than on the vehicle front 33. Since it is largely the rough targets 31 on the vehicle flank 34 that contribute to the formation of the specific radial distance $s_r$, the specific radial distance $s_r$ shifts continuously within a short segment of time from the vehicle front 33 to the lateral flank of the vehicle 3. This brief reverse change in the specific radial distance $s_r$ causes a clearly visible section of discontinuity U in the curve of the graph with a rise deviating from the preceding curve of the graph.

No further substantial change in the specific radial distance $s_r$ occurs along the rest of the route traveled by the vehicle 3 (after measurement time $t_4$) until exiting the radar cone 12. After the section of discontinuity U, the graph of the function proceeds in the same way as before measurement time $t_3$ as a virtually linearly falling straight line.

The length of the section of discontinuity U is a characteristic expression of the length of the vehicle 3 and can be evaluated correspondingly. In case of a long vehicle 3 (e.g., truck or bus) because of the greater distance between the vehicle front 33 and the rear end of the vehicle flank 34, the specific radial distance $s_r$ undergoes a greater change in radial distance taking place over a longer time period than for a short vehicle 3 (e.g., passenger car) in which the distance of the rear end of the vehicle flank 34 from the vehicle front 33 is appreciably shorter.

Since the change in the specific radial distance $s_r$ is a function of time, the evaluation also depends on the vehicle speed. Therefore, in a sixth method step (not shown) the determined length of the section of discontinuity U is normalized to a calculated vehicle speed.

The vehicle 3 can then be classified based on a comparison of the determined normalized length of the section of discontinuity U of a detected vehicle 3 with stored typical speed-normalized lengths of such sections (model lengths).

These model lengths can be obtained in that vehicles 3 whose classification is known and which drive through the same or an identical radar cone 12 at the normalized speed are detected using the same method.

In theory, learning of this kind can take place immediately before actual implementation of the method after the arrangement of the radar device 1 relative to the roadway 2. The vehicles 3 then pass through the same radar cone 12. In this case, the radar device 1 need not necessarily be arranged exactly with predefined installation angles 15, 17 and distances 14, 16 with respect to the roadway 2 when normalizing to the radial velocity rather than to the vehicle speed.

In practice, however, the radar device 1 preferably learns once and, for subsequent implementations of the method, the radar device 1 is then set up exactly as it was set up for learning. The vehicles 3 then pass through a radar cone 12 which is the same to a certain extent.

In a second embodiment example, instead of the change in the specific radial distance $s_r$ referring to FIG. 2c, the change in the specific object angle β is used for evaluation and classification. In this case, also, the graph of the function exhibits a section of discontinuity U having a typical length depending on vehicle class.

In a further embodiment example of the method, the classification that is made as was shown according to the first or second embodiment example is verified or improved by combining with a further evaluation method.

For this purpose, the statistical distribution of the rough targets 31 is acquired at predetermined measurement times $t_n$ when tracking vehicles 3 on their way through the radar cone 12. The statistic distribution of the rough targets 31 represents a rough measure of the dimensions of the acquired vehicles 3 and gives an indication of the vehicle class.

Figure 3:
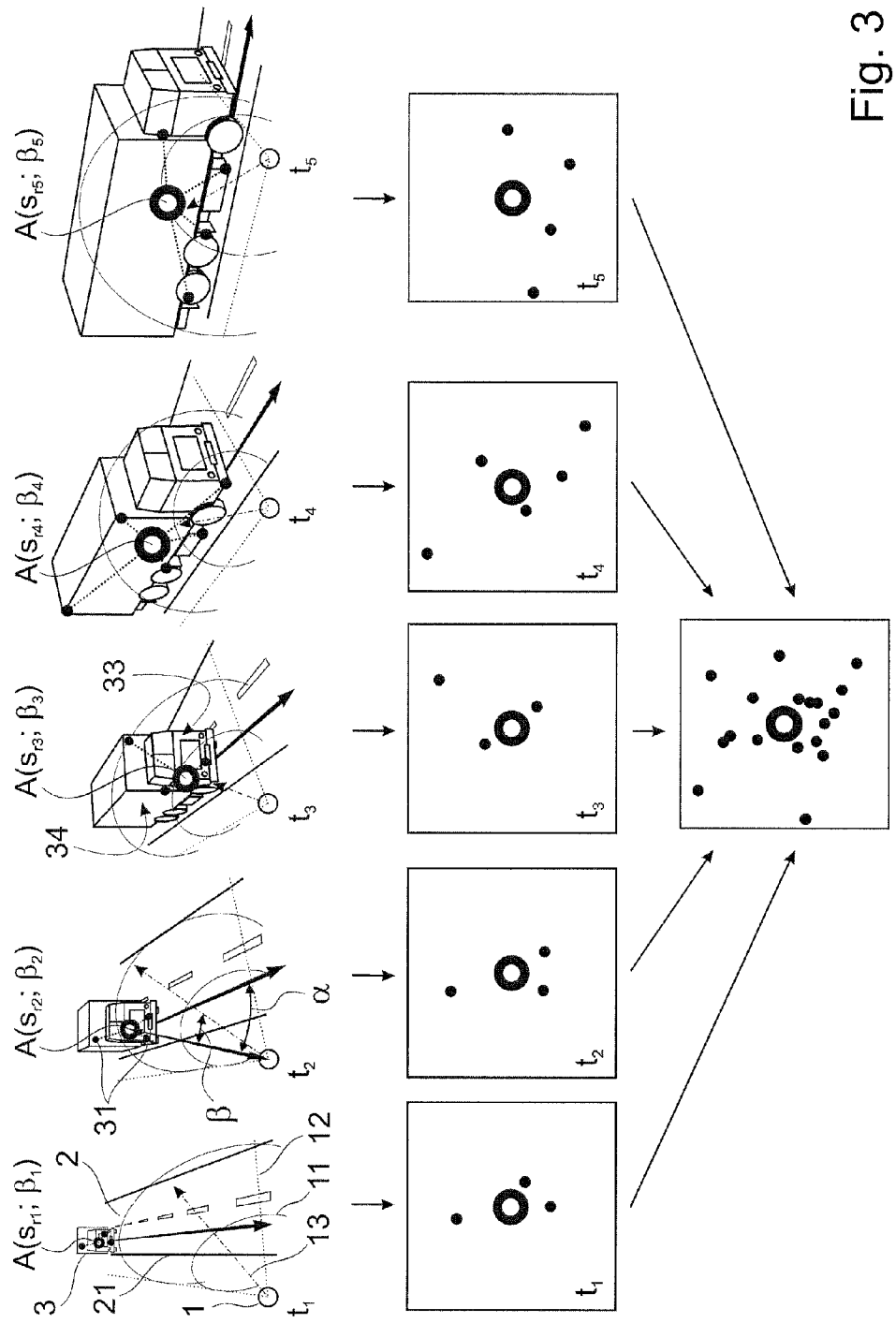
FIG. 3 is an illustration of the acquisition of a typical static spread of rough targets.

As is shown schematically in FIG. 3, a temporary coordinate system which moves along with the vehicle 3 during tracking can be used for capturing the statistic distribution of the rough targets 31 for each acquired vehicle 3. Linking of the temporary coordinate system to the detected vehicle 3 is carried out so as to be tied to the measurement time by the specific radial distance $s_r$ determined for the rough targets 31 at the respective measurement time $t_n$ which forms the origin of the coordinate system. At fixed positions which are reached by the vehicle 3 when traveling through the radar cone 12 and which are also identical for every other detected vehicle 3, all of the rough targets 31 of the vehicle 3 which can be acquired at these measurement times $t_n$ are inputted in the temporary coordinate system and stored.

Finally, all of the individual distributions which are acquired from this vehicle 3 and stored are superimposed by superimposing the temporary coordinate systems and determining the statistical spread of the rough targets 31 in the coordinate system. The spread is characteristic for the different vehicle classes. This includes not only substantially the vehicle length but also the vehicle width and vehicle height. The detected vehicle 3 can be assigned to vehicle classes based on a comparison with spreads of vehicles 3 that have already been classified.

It may also be sufficient to acquire the distribution of rough targets 31 of the vehicle 3 at only one measurement time $t_n$. The measurement time $t_n$ is advantageously chosen such that the most characteristic possible distribution and the broadest possible spatial differentiation of different rough targets 31 on the detected vehicle 3 can be expected. The most suitable positions are those in which more rough targets 31 are acquired on the vehicle flank 34 than on the vehicle front 33 and the vehicle 3 is located close to the radar device 1 in perspective. According to FIG. 2a, this applies particularly to all measurement times $t_n$ after measurement time $t_4$. When the geometric distribution of rough targets 31 is assessed at such a measurement time $t_n$, conclusions may be drawn about the vehicle class based on the spread of the geometric distribution and comparison with spreads that have been determined and classified beforehand.

In a further embodiment example of the method, the method according to the first or second embodiment example is supplemented for purposes of verification by an additional evaluation method for classification. For this purpose, a method is used which has already been described for cw radar in J. X. Fang et al., "A ground vehicle classification approach using unmodulated continuous-wave radar", IET International Conference on Radar Systems 2007, pages 1-4, and which is expanded herein for use with FSK radar 1.

Generally, every vehicle 3 has different surface portions which are highly reflective for the radar radiation 11. These often include surfaces of add-on parts standing out from the body, e.g., license plates, side mirrors, door handles, edges of bumpers, windshield frames, parts of the body having steep angle gradients, and so on. If only the reflection signals of these surface portions at the vehicles 3 are acquired and evaluated, a characteristic reflection pattern can be shown at some of these surface portions which is also found on identical surface portions of different vehicles 3 of a vehicle class. With suitable search methods, these reflection patterns can be searched for in the reflection signals and their arrangement can be evaluated. A comparison of type and arrangement of reflection patterns with reflection patterns that have already been classified then allows the detected vehicle 3 to be classified.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS

1 radar device
11 radar radiation
12 radar cone
13 axis of symmetry
14 horizontal installation distance
15 horizontal angle
16 vertical installation distance
17 vertical angle
2 roadway
21 edge of roadway
22 bridge
3 vehicle
31 rough target
32 specific position value
33 vehicle front
34 vehicle flank
$t_n$ measurement time
$s_r$ radial distance of the specific position value, specific radial distance
β specific object angle, object angle of the specific position value
U section of discontinuity
α vehicle angle

What is claimed is:

1. Method for classifying moving vehicles by tracking a position value of the vehicle in which vehicles are measured while passing through a radar cone formed by radar radiation in that the surfaces of the vehicles impinged by radar radiation reflect the radar radiation and generate measurement signals in a radar device emitting and receiving the radar radiation, comprising the following steps:

a) arranging a radar device at a known installation height and at a known vertical installation angle relative to a surface of a roadway and at a known horizontal installation angle and horizontal distance relative to an edge of said roadway, wherein said radar device is adapted to receive a plurality of measurement signals at a plurality of measurement times within a measurement duration, so that a radial velocity and, as position values, a radial distance and an object angle can be derived for each measurement signal, b) emitting a radar beam from said radar device forming a radar cone, and acquiring measurement signals at a plurality of measurement times, c) deriving radial velocities, object angles and radial distances from the measurement signals for each measurement time and assigning said radial velocities, object angles and radial distances to a vehicle giving rise to them, as the case may be, while passing through the radar cone, d) forming a specific position value for each measurement time formed from the radial distances or object angles associated with a vehicle by a same computation rule in each instance and calculating a vehicle speed, e) the specific position values being stored as a function over a measurement duration encompassing the measurement times, and a section of discontinuity that is bounded by sudden changes in the specific position value over the measuring period is determined in the curve of the function, and f) determining a speed-normalized length of the section of discontinuity by means of the calculated vehicle speed, and comparing this speed-normalized length of the section with stored speed-normalized lengths of such sections which are typical of various classes of vehicles in order to classify the vehicle.

2. Method according to claim 1, wherein the specific position value for each measurement time is formed by calculating the arithmetic mean of the radial distances associated with this measurement time, and at least one of the installation angles is an acute angle.

3. Method according to claim 1, wherein the specific position value is formed per measurement time by calculating the arithmetic mean of the object angle associated with this measurement time, and the horizontal installation angle is an acute angle, and the vertical installation angle is less than 5°.

4. Method according to claim 1, wherein at least one vehicle-specific coordinate system is calculated from the associated measurement signals so as to be related to the measurement time, the position and orientation of the vehicle-specific coordinate system being defined at each measurement time by a temporary location of the coordinate origin determined by the specific position value and a temporary driving direction, in that the radial distances and object angles which are derived at each measurement time and which respectively represent location coordinates of a rough target at the vehicle at this measurement time are converted in each instance into the vehicle-specific coordinate system, and the statistical distribution of the position of the rough targets is compared with stored distributions typical of different vehicle classes so as to verify the classification of the vehicle that has been made.

5. Method according to claim 4, wherein the statistical distribution of the position of the rough targets at individual measurement times is combined by superimposing the coordinate systems.

* * * * *